UNITED STATES PATENT OFFICE.

THOMAS E. PHILLIPS, OF BLOOMINGTON, INDIANA, ASSIGNOR OF ONE-HALF TO BENJAMIN A. McGEE, GEORGE W. BOLENBACHER, PHILIP K. BUSKIRK, AND JAMES KARSELL, OF SAME PLACE, AND JAMES H. DUNN, OF LOUISVILLE, KENTUCKY.

PROCESS OF SEPARATING FIBERS OF REED-CANE.

SPECIFICATION forming part of Letters Patent No. 514,027, dated February 6, 1894.

Application filed February 2, 1893. Serial No. 460,757. (No specimens.)

*To all whom it may concern:*

Be it known that I, THOMAS E. PHILLIPS, of Bloomington, in the county of Monroe and State of Indiana, have invented certain new and useful Improvements in Processes of Separating the Fibers of Reed-Cane; and I do hereby declare that the following is a full, clear, and exact description thereof.

The present invention relates to vegetable fibers and its object is to produce a fiber from reed cane and similar growths of the genus *Arundinaria macrosperma*, which when treated by my process and combination of chemicals yields a strong, durable and flexible fiber that can be woven into cloth, spun into twine, and variously used in the arts, and the short fibers and dust resulting from the process can be utilized as oakum, or for paper making, or as a fertilizer, &c.

I form a solution of the following ingredients: Concentrated lye, (potash or crude potassium carbonate containing on analysis potassium carbonate and potassium hydrate, from thirty-five to fifty per cent. potassium carbonate and from thirty to fifty per cent. potassium hydrate with impurities of potassium sulphate and chloride, with one to five per cent. sodium carbonate,) of this four pounds; chloride of zinc, (commercially pure) one pound; petroleum, (coal oil 150° to 200° fire test,) one quart; water forty gallons.

The proportions of the ingredients might be varied within certain limits, according to the density of the vegetable matter being treated, to obtain good results.

The petroleum acts as a vehicle to facilitate the penetration of the alkali and acids into the wood, and the fiber produced is smoother, softer and more easily separable, and the dust can be more easily separated from the fiber in cleaning. The zinc chloride rendered the fiber non-corrosive or non-putrefying, tougher and stronger. The reed cane is placed in vats and immersed in the solution, and if cold, about eighteen to twenty-four hours are required, to separate the woody matters from the fibers of the wood. By keeping the solution heated, the results are obtained in much less time; and at a temperature of 200° Fahrenheit the composition will produce the desired result in from seven to twelve hours according to the density of the cane being treated.

Preferably the cane is crushed between rollers before treatment by the solution, and after treatment is run between other rolls by which it is gradually cleansed and reduced to fibrous condition.

I operate especially on reed cane which is abundant along the Mississippi, and by my process and chemicals I produce therefrom a long, tough, smooth fiber of a length equal to the length of the joints in the reeds. Such fibers when properly treated are strong, smooth, easily separable, and well adapted for spinning, weaving cordage, rope, &c., and is a superior substitute for manila, hemp, ramie, and jute, and can be used in place of sisal and hemp.

By my treatment of the reed cane I obtain about fifteen hundred pounds of clean fiber per ton of cane treated.

Having described my invention, what I claim as new, and desire to secure by Letters Patent thereon, is—

The process of disintegrating reed cane and woody matters consisting in subjecting them to the action of petroleum, potassium carbonate, and zinc chloride, in solution, substantially as and in proportions specified and for the purpose described.

In testimony that I claim the foregoing as my own I affix my signature in presence of two witnesses.

THOMAS E. PHILLIPS.

Witnesses:
JAS. R. MANSFIELD,
DAVID E. MOORE.